May 24, 1932. J. ENGL 1,859,822
PHOTO ELECTRIC CELL CIRCUIT
Filed Nov. 2, 1929
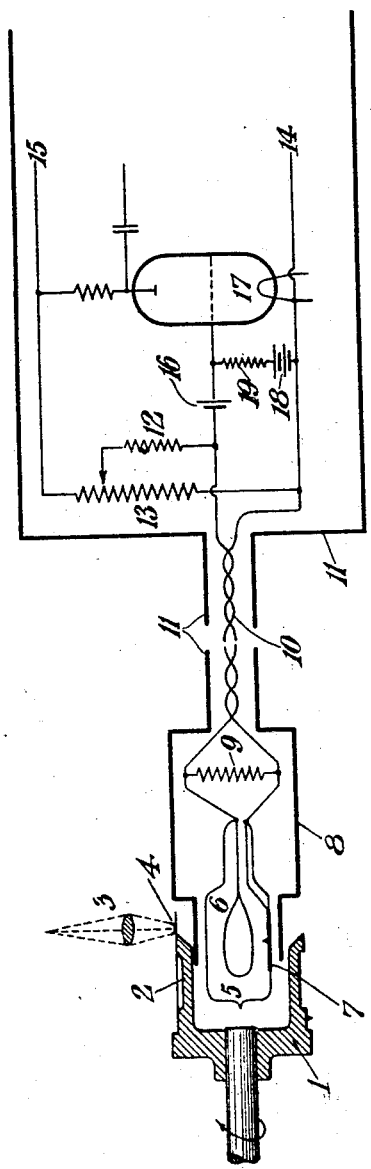
INVENTOR
*Josef Engl*
BY
*Ward Crosby & Neal*
ATTORNEYS Patented May 24, 1932

1,859,822

UNITED STATES PATENT OFFICE

JOSEF ENGL, OF BERLIN-GRUNEWALD, GERMANY, ASSIGNOR TO ENGL PRODUCTS CORPORATION, OF NEW YORK, N. Y., A CORPORATION OF NEW YORK

PHOTO-ELECTRIC CELL CIRCUIT

Application filed November 2, 1929, Serial No. 404,497, and in Germany November 13, 1928.

This invention relates to a connection of the photoelectric cell in a sound-reproducing contrivance in which sound is produced by means of an electric current that is controlled by a pencil of light rays which is itself varied in its intensity in penetrating a phonogram that is photographically recorded upon a moving film strip.

Inasmuch as a photoelectric cell has a definite capacity which forms a capacitative short-circuit, which proves to be variable in a disturbing manner according to the height of the frequency of the alternating current, it was proposed, for the purpose of diminishing this detrimental influence, to apply a high resistance of the order of magnitude of about 500,000 ohms in parallel to the photoelectric cell. Heretofore it was customary to arrange this parallel resistance next to the parts of the amplifier contrivance, i. e., separated from the photoelectric cell, in the amplifier cabinet, which is set up at a considerable distance from the photoelectric cell and which is connected with the cathode and anode of the photoelectric cell by two wire conductors.

It was found that these wire connections act in a manner similar to an air conductor and intercept stray electric or magnetic fields or electromagnetically diffused disturbances which occur in the vicinity of the reproducing contrivance and may in particular originate from spark-forming contacts of electrical devices situated in the vicinity. Since, however, these disturbances are likewise considerably amplified also in the multiple amplification, they manifest themselves in a disturbing manner in the reproducing loud-speaker.

In accordance with the invention this drawback is abolished by this means, namely, the parallel resistance for the photoelectric cell is arranged in the cell-socket directly next to the cell, so that the wire connections between the cell and the resistance as a result have a length of only a few millimeters and are furthermore screened off from the outside by the metal of the socket. In this arrangement a twisted pair of wires may then be used as a feed connection to the amplifier, a circumstance which would not otherwise be possible because of the capacity of the wire conductors that is thereby produced. The twisted pair of conductors is insensitive to electromagnetic disturbances and may further be protected from electrostatic disturbances by a grounded metal sheath.

The invention accordingly consists in the features of construction, combination of elements and arrangements, and the scope of the application of which will be indicated in the claims that follow.

In order that a clearer understanding of my invention may be had, attention is hereby directed to the accompanying drawing forming a part of this application and illustrating diagrammatically an embodiment thereof in a form in which I now desire to practice my invention.

Referring now to the drawing, the film 2, which runs in well-known fashion over a sprocket drum 1, is penetrated at its edge 4, which projects beyond the drum 1, by a pencil of light-rays 3 which thereupon, after variation of its intensity, impinges upon the photoelectric cell 5. The cell 5, which has in well-known fashion an anode 6 and a cathode 7, projects into the interior of the sprocket drum 1, which is built hollow, and it is surrounded by the cell socket 8. Between the terminals of the cells, directly next to the cell inside of the cell socket, there is situated the resistance 9. A twisted pair of conductors 10 connects the cell with the amplifier, which is situated at some distance from it. The pair of conductors 10 as well as the amplifier itself are surrounded with a metal sheath 11 for the purpose of screening. The connections inside of the amplifier are chosen in such a way that a coupling resistance 12 is connected in series with the connection wires 10. A potentiometer 13, which is connected by means of the conductors 14 and 15 with a battery that is not shown in the drawing, supplies the required cell potential in shunt. The variations of potential that are produced by the variations of light are conducted to the grid of the initial tube 17 of the amplifier across a coupling capacity 16. An applied-potential battery 18 supplies, across the resistance 19, the desired grid bias which is important for the securing of undistorted amplification. The rest of the arrangement of the amplifier is not described, since it may be assumed to be well known.

The screening of the conductor 10 may advantageously be effected by placing it in a movable metal tubing. Other advantageous forms of embodiment, not described here, which are entirely within the scope of the invention, are also possible.

While I have described my improvements in great detail and with respect to a preferred embodiment thereof, I do not desire to be limited to such details or forms since many changes and modifications may be made and the invention embodied in widely different forms without departing from the spirit and scope thereof in its broader aspects. Hence I desire to cover all forms coming within the language or scope of any one or more of the appended claims.

What I claim as new and desire to secure by Letters Patent, is:

1. In a device of the kind described, in combination, a photoelectric cell, a parallel resistance connected across the terminals of said cell directly next to the cell, a twisted pair of conductors connected to said resistance, said resistance being located between the terminals of the cell and the conductors, and an amplifier connected to said conductors.

2. In a device for talking films, in combination, a photoelectric cell adapted to receive light rays passing through a phonogram, a socket for said cell, a parallel resistance in said socket across the terminals of said cell, a twisted pair of conductors connected to said resistance, said resistance being located between said conductors and the terminals of said cell, and an amplifier connected to said conductors.

3. In a device for talking films, in combination, a photoelectric cell adapted to receive light rays passing through a phonogram, a socket for said cell, a parallel resistance in said socket across the terminals of said cell, a twisted pair of conductors connected to said resistance, said resistance being thus located between said conductors and the terminals of said cell, an amplifier connected to said conductors, and a metal sheath surrounding said conductors and said amplifier.

4. In sound reproduction apparatus utilizing a film record strip, in combination, a photoelectric cell, means for advancing the film past said cell, means for directing a beam of light through the sound record of the film and on to said cell, a socket for receiving said cell, a resistance connected across the terminals of said cell at a point closely adjacent the cell at said socket, and electrical connections running from said cell to an amplifier at a relatively remote point.

5. In sound reproduction apparatus utilizing a film record strip, in combination, a photoelectric cell, means for advancing the film past said cell, means for directing a beam of light through the sound record of the film and on to said cell, a resistance connected across the terminals of said cell at a point closely adjacent the cell and electrical connections running from said cell to an amplifier at a relatively remote point.

6. In a sound reproduction device of the character described, a photoelectric cell, a resistance directly next to the cell connected in parallel with the cell across the terminals thereof, an amplifier remote from the cell, and a plurality of conductors connecting the terminals of the cell with the amplifier.

7. In sound reproduction apparatus utilizing a film record strip, in combination, a photoelectric cell, means for advancing the film past the cell, means for directing a beam of light through the sound record of the film and on to said cell, an amplifier, conductors connecting the terminals of the cell with the amplifier and a resistance directly next to the cell connected across the cell terminals and between the conductors.

In testimony whereof I have signed my name to this specification.

JOSEF ENGL.